(12) United States Patent
Takahashi

(10) Patent No.: US 10,755,389 B2
(45) Date of Patent: Aug. 25, 2020

(54) IMAGE PROCESSING APPARATUS, IMAGE PROCESSING METHOD, AND MEDIUM

(71) Applicant: CANON KABUSHIKI KAISHA, Tokyo (JP)

(72) Inventor: Naoto Takahashi, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 15/432,740

(22) Filed: Feb. 14, 2017

(65) Prior Publication Data

US 2017/0243332 A1    Aug. 24, 2017

(30) Foreign Application Priority Data

Feb. 22, 2016  (JP) .................... 2016-031173

(51) Int. Cl.
| | |
|---|---|
| *G06T 5/00* | (2006.01) |
| *G06T 7/13* | (2017.01) |
| *G06K 9/44* | (2006.01) |
| *G06K 9/40* | (2006.01) |
| *G06K 9/46* | (2006.01) |

(52) U.S. Cl.
CPC .............. *G06T 5/003* (2013.01); *G06K 9/40* (2013.01); *G06K 9/44* (2013.01); *G06K 9/4604* (2013.01); *G06T 5/002* (2013.01); *G06T 7/13* (2017.01); *G06K 2209/05* (2013.01); *G06T 2207/10116* (2013.01); *G06T 2207/10124* (2013.01); *G06T 2207/20192* (2013.01)

(58) Field of Classification Search
CPC ................. G06T 5/002; G06T 5/003
See application file for complete search history.

(56) References Cited

U.S. PATENT DOCUMENTS

| | | | | |
|---|---|---|---|---|
| 4,761,819 A | * | 8/1988 | Denison | G06K 9/40 382/128 |
| 5,050,227 A | * | 9/1991 | Furusawa | G06T 5/20 358/448 |
| 6,763,129 B1 | * | 7/2004 | Honda | G06K 9/40 382/132 |

(Continued)

FOREIGN PATENT DOCUMENTS

| | | |
|---|---|---|
| JP | 2003-101815 A | 4/2003 |
| JP | 2003-348450 A | 12/2003 |

(Continued)

*Primary Examiner* — Nay A Maung
*Assistant Examiner* — Jose M Torres
(74) *Attorney, Agent, or Firm* — Canon U.S.A., Inc. IP Division

(57) ABSTRACT

In a case where noise reduction processing is performed on an image acquired by radiography, the noise reduction processing is prevented from being influenced by other image processing performed in advance. A structure determination unit determines a structure present in a target pixel of a preprocessed captured image. A first image processing unit performs a predetermined image processing based on a determination result of the structure present in the target pixel of the preprocessed captured image. A second image processing unit performs image processing different from the predetermined image processing on an image acquired through the predetermined image processing performed by the first image processing unit.

25 Claims, 8 Drawing Sheets

(56) References Cited

U.S. PATENT DOCUMENTS

| | | | | |
|---|---|---|---|---|
| 7,139,416 B2* | 11/2006 | Vuylsteke | | G06T 5/009 |
| | | | | 382/128 |
| 9,639,915 B2* | 5/2017 | Xu | | G06T 5/00 |
| 2004/0258201 A1* | 12/2004 | Hayashida | | A61B 6/583 |
| | | | | 378/62 |
| 2005/0254721 A1* | 11/2005 | Hagiwara | | G06T 5/008 |
| | | | | 382/260 |
| 2006/0291742 A1* | 12/2006 | Zhang | | G06T 5/009 |
| | | | | 382/266 |
| 2008/0285882 A1* | 11/2008 | Lin | | G06T 5/004 |
| | | | | 382/266 |
| 2009/0196524 A1* | 8/2009 | Godin | | G06T 5/004 |
| | | | | 382/263 |
| 2015/0131885 A1* | 5/2015 | Kim | | G06T 5/20 |
| | | | | 382/132 |
| 2018/0240218 A1* | 8/2018 | Shimahashi | | G06K 9/4609 |

FOREIGN PATENT DOCUMENTS

| | | |
|---|---|---|
| JP | 3903027 B2 | 4/2007 |
| JP | 2008-017458 A | 1/2008 |
| JP | 4679710 B2 | 4/2011 |

* cited by examiner

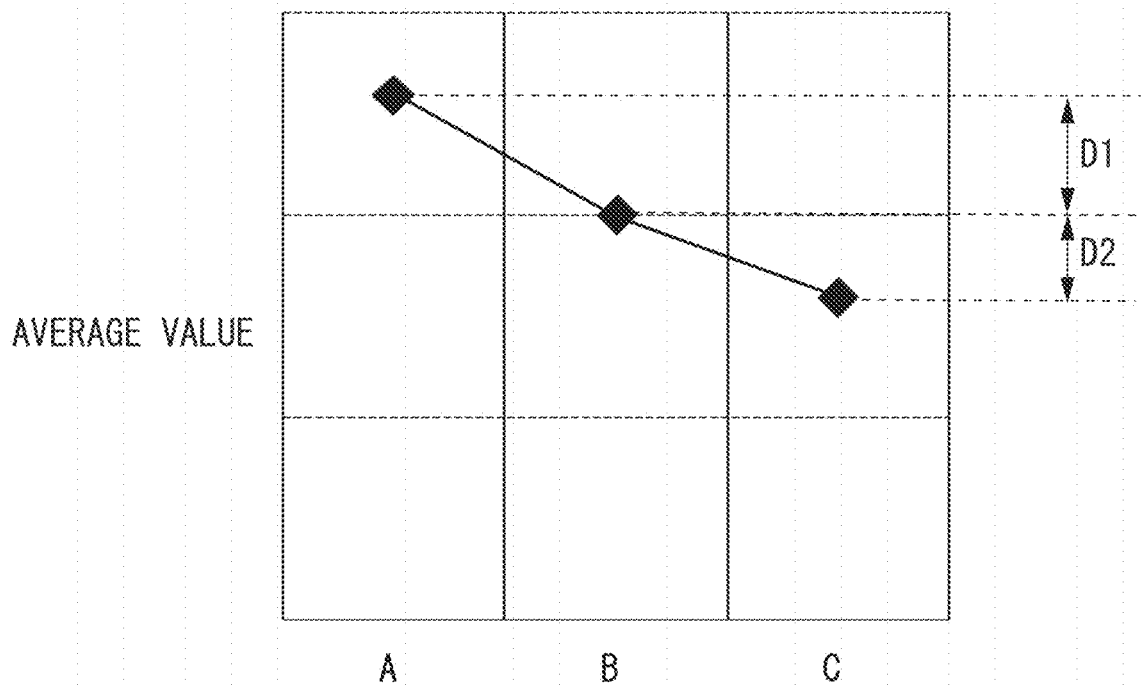

FLAT

GRADATION

EDGE

THIN LINE

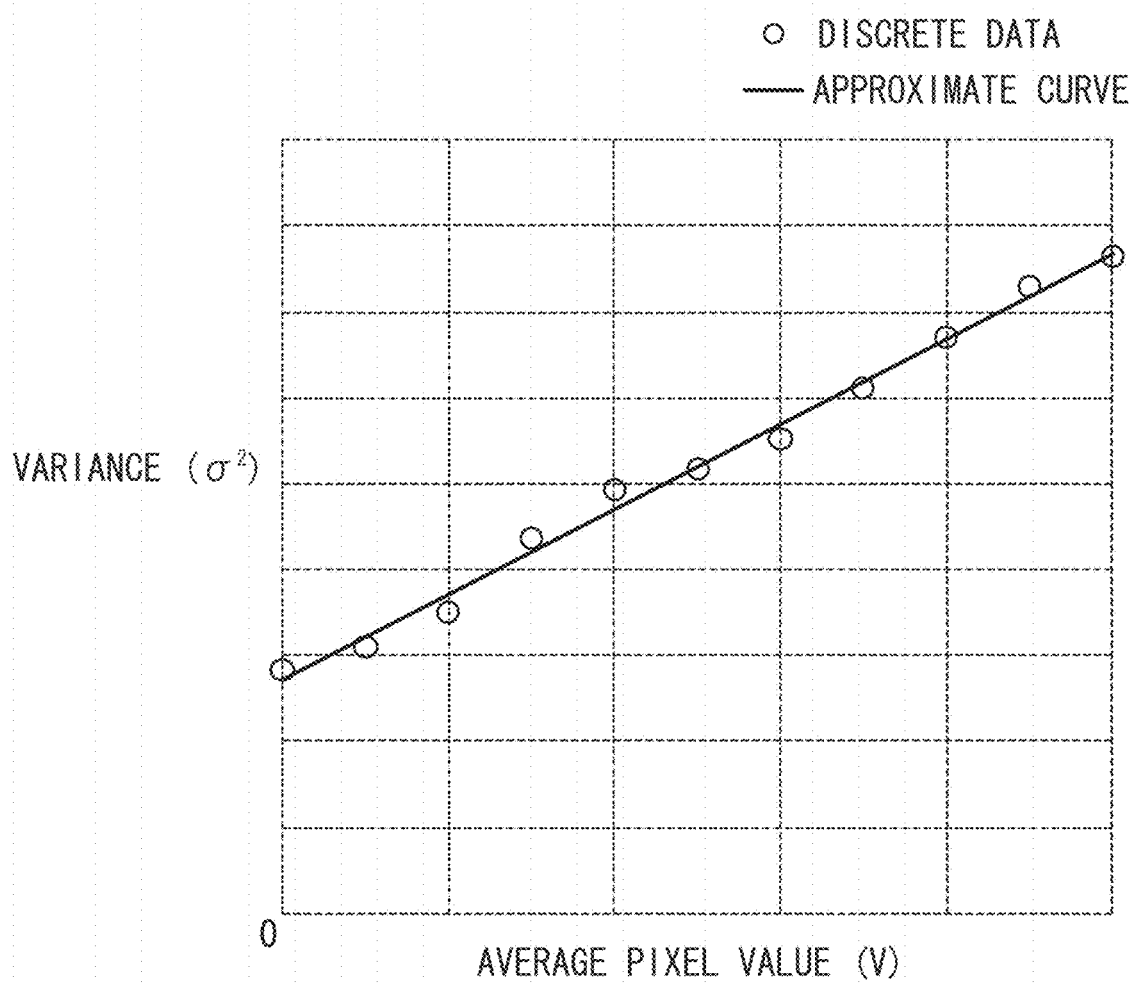

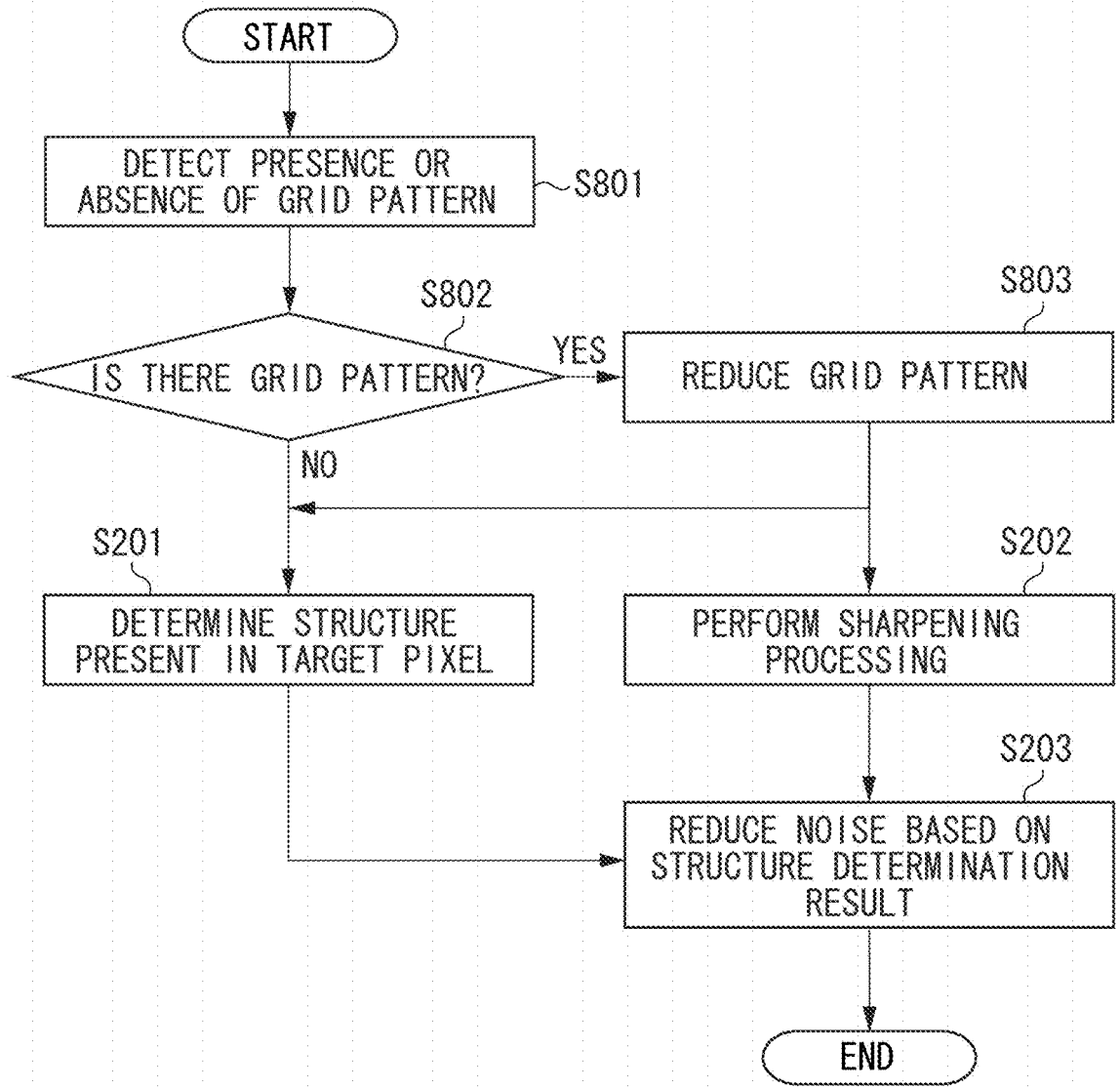

IMAGE PROCESSING APPARATUS, IMAGE PROCESSING METHOD, AND MEDIUM

BACKGROUND OF THE INVENTION

Field of the Invention

The aspect of the embodiments relates to an image processing apparatus, an image processing method, and a medium, and more particularly suitable to those for reduction of noise in an image acquired by radiographic imaging.

Description of the Related Art

A technique for visualizing the inside of a subject has been used. According to the technique, the subject is irradiated with radiation typified by an X-ray, and imaging of a radiation component that has been transmitted through the subject is performed to visualize the inside of the subject.

A radiographic apparatus for imaging such a radiographic image generally performs various types of image processing to enhance quality of a captured image. One of the various types of image processing is noise reduction processing for reducing quantum noise due to fluctuations in radiation quantum and system noise generated by a detector and a circuit.

Various methods have conventionally been discussed as methods for reducing such noise. For example, Japanese Patent No. 4679710 discusses a technique for changing a characteristic of a smoothing filter in accordance with a noise characteristic.

In a case where a suitable smoothing operation is performed in accordance with a noise characteristic as discussed in Japanese Patent No. 4679710, the noise characteristic of an image need to be known. Thus, generally, the noise characteristic is also estimated from a relationship between a dose of radiation to be used for photography and noise.

In such a radiographic apparatus, various types of image processing, such as sharpening processing, dynamic range compression processing, and tone conversion processing are often also performed in addition to the noise reduction processing. In this case, as a process sequence, the noise reduction processing is sometimes executed after other types of image processing. In such a case, when the noise reduction is performed, the relationship between the radiation dose and the noise is changed due to an influence of the other types of image processing. Consequently, the noise characteristic is not accurately estimated.

Japanese Patent Application Laid-Open No. 2003-101815 discusses a technique for allowing image processing other than noise reduction processing to be performed subsequent to the noise reduction processing. That is, before the noise reduction processing is performed, other types of image processing are not executed. In this case, a process sequence is restricted, and configuration flexibility is lost. Moreover, Japanese Patent Application Laid-Open No. 2008-17458 discusses a technique for correcting a change in a noise characteristic of an image due to image processing that is other than noise reduction processing and performed prior to the noise reduction processing. According to such a technique, the correction is not accurately made if the image processing to be performed prior to the noise reduction processing is nonlinear processing.

SUMMARY OF THE INVENTION

According to an aspect of the embodiments, an image processing apparatus includes a processing unit configured to perform processing for determining a structure present in a target pixel of a first image, a first image processing unit configured to perform predetermined image processing on the first image, and a second image processing unit configured to perform image processing different from the predetermined image processing on a second image acquired through the predetermined image processing, based on a determination result of the structure.

According to another aspect of the embodiments, an image processing apparatus includes a processing unit configured to perform processing for determining a structure present in a target pixel of a first image, and a first image processing unit configured to perform sharpening processing on the first image, wherein, to both the processing unit and the first image processing unit, an image acquired by radiography is output as the first image.

Further features of the disclosure will become apparent from the following description of exemplary embodiments with reference to the attached drawings.

BRIEF DESCRIPTION OF THE DRAWINGS

FIG. 4 is a diagram illustrating a method for determining a structure.

FIG. 6 is a diagram illustrating a relationship between an average pixel value and a noise variance.

FIG. 8 is a flowchart illustrating an operation performed by the image processing unit according to the second exemplary embodiment.

DESCRIPTION OF THE EMBODIMENTS

Hereinafter, exemplary embodiments are described with reference to the drawings.

A first exemplary embodiment is described.

Figure 1:
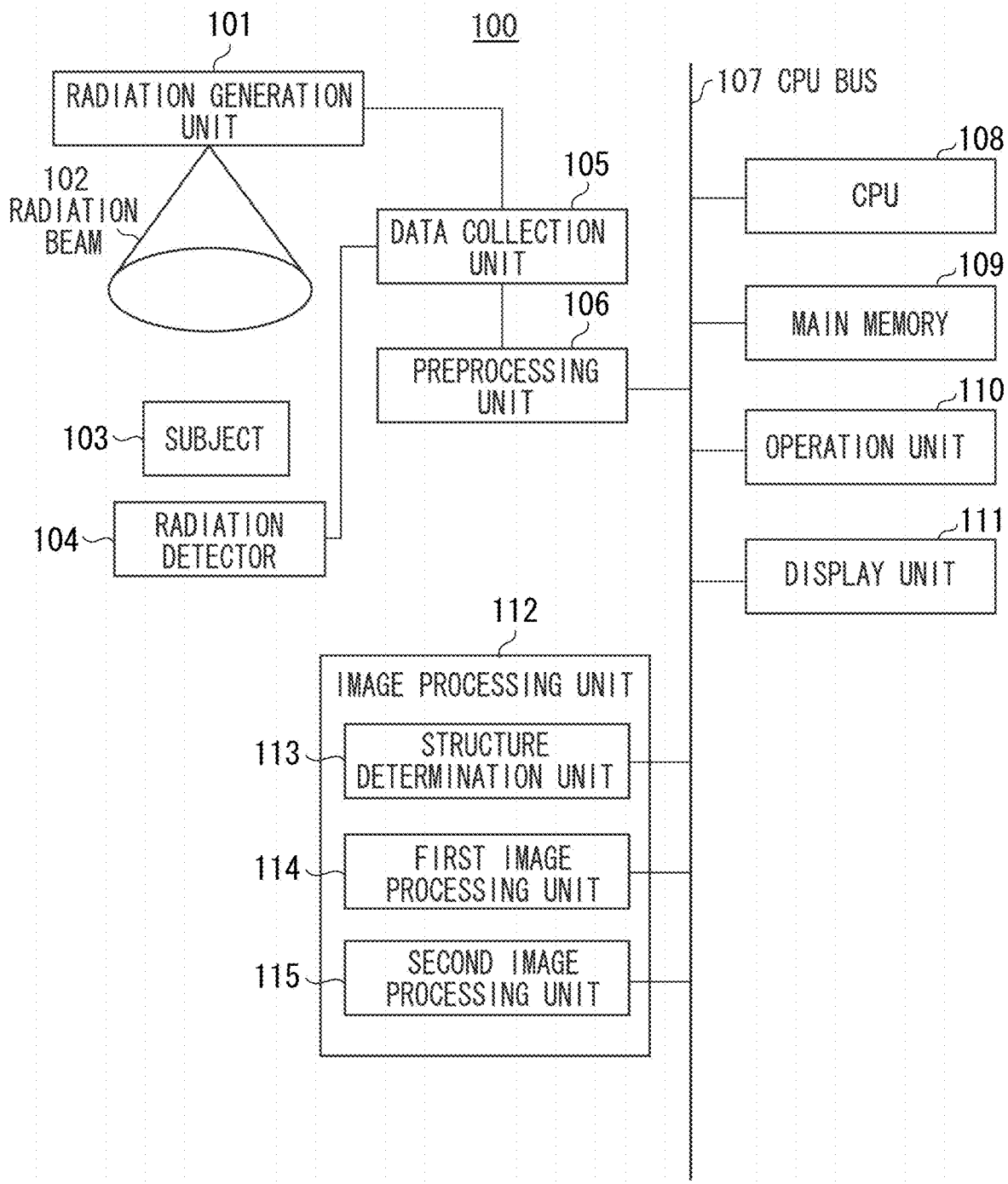
FIG. 1 is a diagram illustrating a configuration of a radiographic apparatus according to a first exemplary embodiment.

FIG. 1 is a diagram illustrating an example of a configuration of a radiographic apparatus 100 that has a plurality of image processing functions including a noise reduction processing function. The radiographic apparatus 100 includes a radiation generation unit 101, a radiation detector 104, a data collection unit 105, a preprocessing unit 106, a central processing unit (CPU) 108, a main memory 109, an operation unit 110, a display unit 111, and an image processing unit 112. These units are mutually connected such that data can be exchanged with one another via a CPU bus 107.

The image processing unit 112 performs a plurality of types of image processing including noise reduction processing on an image captured by the radiation detector 104. The image processing unit 112 includes a structure determination unit 113, a first image processing unit 114, and a second image processing unit 115.

The main memory 109 stores various data for processing by the CPU 108 and also functions as a working memory of the CPU 108. The CPU 108 uses the main memory 109 to comprehensively control operations and the like of the radiographic apparatus 100 according to an operation input from the operation unit 110. Thus, the radiographic apparatus 100 operates as follows.

When an operator inputs an imaging instruction via the operation unit 110, the CPU 108 transmits the imaging instruction to the data collection unit 105. Upon receipt of the imaging instruction, the CPU 108 controls the radiation generation unit 101 and the radiation detector 104 to execute radiographic imaging.

In the radiographic imaging, the radiation generation unit 101 emits a radiation beam 102 to a subject 103. The radiation beam 102 emitted from the radiation generation unit 101 is transmitted through the subject 103 while being attenuated. Then, the radiation beam 102 reaches the radiation detector 104. The radiation detector 104 outputs a signal according to intensity of the radiation which has reached. In the present exemplary embodiment, the subject 103 is a human body. The signal output from the radiation detector 104 is therefore data acquired by imaging a human body.

The data collection unit 105 converts the signal output from the radiation detector 104 into a predetermined digital signal, and supplies the resultant signal as image data to the preprocessing unit 106. The preprocessing unit 106 performs preprocessing including offset correction and gain correction, to the image data supplied from the data collection unit 105.

Even when a radiation beam is not emitted, a signal level to be output from the radiation detector 104 is not completely zero but includes an offset component, due to an influence of a dark current that is present in each photodiode arranged in such a manner that each photodiode corresponds to each pixel of the radiation detector 104. The preprocessing unit 106 performs the offset correction, so that a signal level to be output when a radiation dose is zero can be uniform in all of pixels. Moreover, each of the pixels of the radiation detector 104 slightly varies in gain (sensitivity). The preprocessing unit 106 corrects such a variation in the gain of the pixels of the radiation detector 104, so that the signal level to be output with respect to a radiation dose becomes uniform in all of the pixels.

The image data preprocessed by the preprocessing unit 106 is sequentially transferred to the main memory 109 and the image processing unit 112 via the CPU bus 107 according to the control by the CPU 108. In the present exemplary embodiment, the radiographic imaging is performed as described above.

The image processing unit 112 executes a plurality of types of image processing on a preprocessed image. The image obtained by the image processing performed by the image processing unit 112 is displayed on the display unit 111. After checking the image displayed on the display unit 111, the operator operates the operation unit 110 to instruct, for example, a printer (not illustrated) to output the image. The image is output to the printer or the like according to the instruction, and a series of imaging operations ends.

Figure 2:
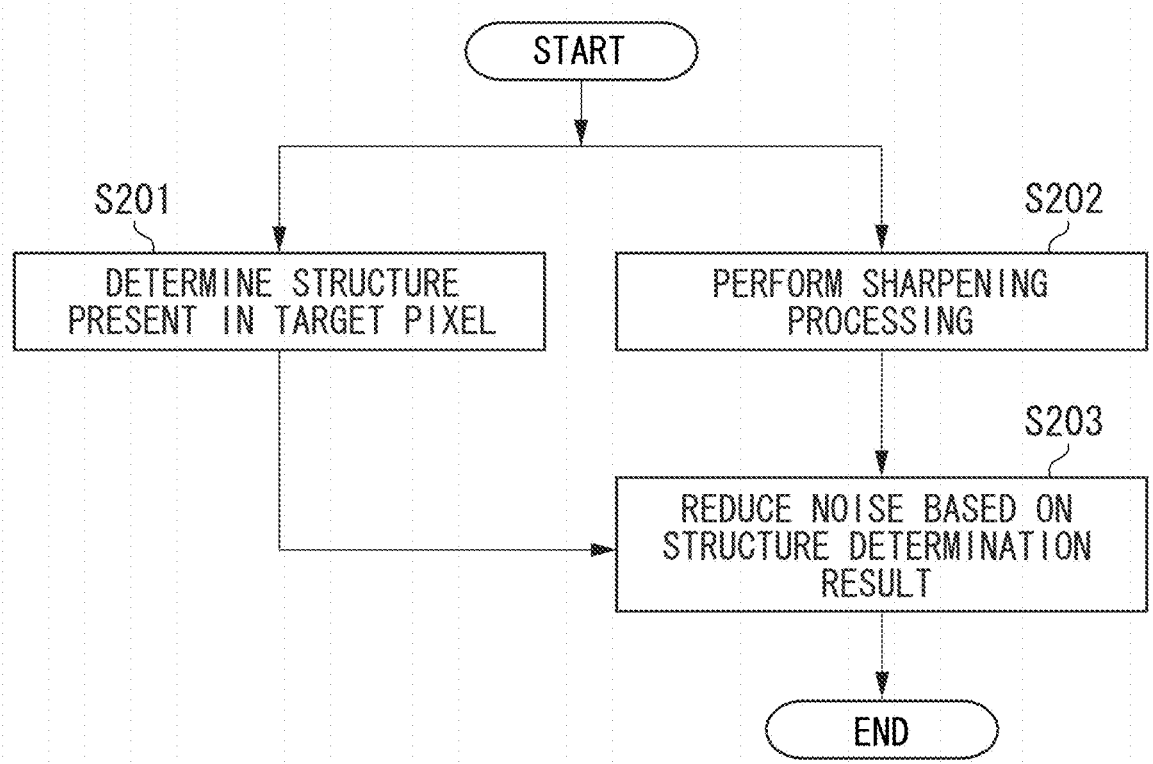
FIG. 2 is a flowchart illustrating an operation performed by an image processing unit according to the first exemplary embodiment.

An example of an operation performed by the image processing unit 112 of the radiographic apparatus 100 including the above-described configurations is described in detail with reference to a flowchart illustrated in FIG. 2.

The image data preprocessed by the preprocessing unit 106 is transferred to the image processing unit 112 via the CPU bus 107 as described above. Then, in step S201, the structure determination unit 113 determines, based on a noise characteristic of the image data, a structure present in a target pixel of a preprocessed captured image. In the present exemplary embodiment, all of pixels of the preprocessed captured image are target pixels. However, it is not necessary to set all of the pixels of the preprocessed captured image as the target pixels. In the present exemplary embodiment, the structure determination unit 113 determines whether a structure present in the target pixel of the preprocessed captured image is any of flat, gradation, edge, and thin line. The structure determination unit 113 determines structure information indicating a structure in an area of N-pixel long by N-pixel wide around the target pixel of the preprocessed captured image for each of the N by N area. The structure determination unit 113, for example, determines whether a structure in an area of N-pixel long by N-pixel wide around the target pixel of the preprocessed captured image is any of flat, gradation, edge, and thin line. Alternatively, the structure determination unit 113 may determine whether a structure in an area of N-pixel long by N-pixel wide around the target pixel of the preprocessed captured image is thin line and determine whether the structure in the area is edge, separately. Moreover, the structure determination unit 113 determines a direction in which the structure extends.

Figure 3:
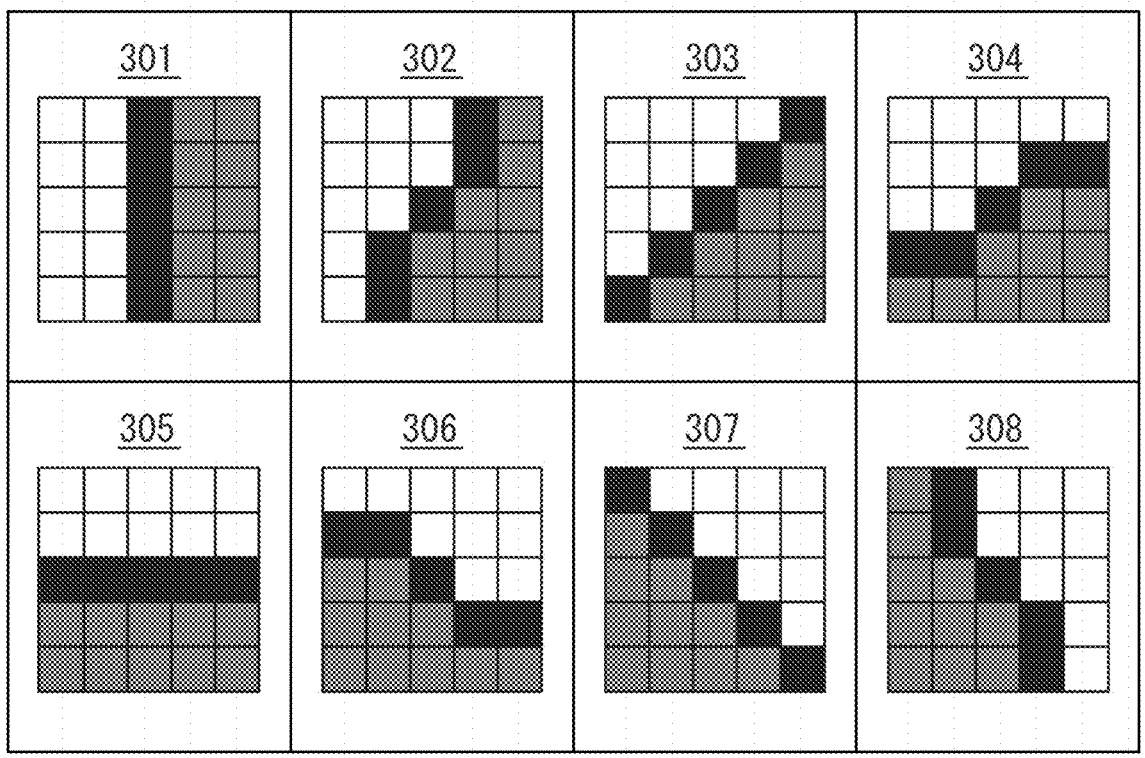
FIG. 3 is a diagram illustrating patterns to be used for detection of a structure.

FIG. 3 is a diagram illustrating a pattern example for detection of the structure.

In the present exemplary embodiment as illustrated in FIG. 3, eight types of patters (filters) are used for detection of structures extending in eight directions. Each of the patterns is N-pixel long by N-pixel wide, for example, 5 pixels by 5 pixels. The structure determination unit 113 sets a filter such that the center of the filter is positioned in the target pixel of the preprocessed captured image. The structure determination unit 113 calculates an average value A of pixel values of pixels corresponding to a white area illustrated in FIG. 3, an average value B of pixel values of pixels corresponding to a black area illustrated in FIG. 3, and an average value C of pixel values of pixels corresponding to a gray area illustrated in FIG. 3. Such average values A, B, and C are calculated every time when each of filters 301 to 308 is set to a different target pixel. For example, in a pattern of the filter 301 illustrated in FIG. 3, assume that a pixel value at i-row and j-column in the image is I(i,j). In such a case, average values A(i,j), B(i,j) and C(i,j) at a target pixel (i,j) are expressed as follows:

$$A(i, j) = \frac{1}{10} \cdot \sum_{\Delta i=-2}^{2} \sum_{\Delta j=-2}^{-1} I(i+\Delta i, j+\Delta j) \quad (1)$$

$$B(i, j) = \frac{1}{5} \cdot \sum_{\Delta i=-2}^{2} I(i+\Delta i, j)$$

$$C(i, j) = \frac{1}{10} \cdot \sum_{\Delta i=-2}^{2} \sum_{\Delta j=1}^{2} I(i+\Delta i, j+\Delta j).$$

Similarly, the structure determination unit 113 calculates average values A, B, and C according to a pattern of a case where each of the other filters 302 to 308 is applied to a target pixel. Subsequently, the structure determination unit 113 calculates an adaptability S for the pattern from the calculated average values A, B, and C. The adaptability S is calculated as follows:

$$S = |A - B| + |B - B| \quad (2).$$

The adaptability S is used to determine what extent an edge (a difference in pixel values) is present in a boundary between the pixels corresponding to the black area and the pixels corresponding to the white area and the gray area illustrated in FIG. 3. If a value of the adaptability S is larger, a more steep edge is likely to be present. Thus, an edge of a significant structure is present along a pattern having an adaptability S that is the largest value out of the adaptabilities S determined for the respective patterns. Accordingly, the structure determination unit 113 determines that a direction in which the black area of such a pattern extends is a direction in which a structure of the target pixel extends.

The structure determination unit 113 uses the average values A, B, and C calculated from the pattern with which a value of the adaptability S is the largest to determine whether the structure is any of flat, gradation, edge, and thin line. FIG. 4 is a diagram illustrating an example of a method for determining whether a structure is any of flat, gradation, edge, and thin line. FIG. 4 illustrates an example of a relationship between three areas (white, black, and gray areas illustrated in FIG. 3) and an average value of pixel values in each pattern. In FIG. 4, in the present exemplary embodiment, the structure determination unit 113 determines a structure based on a difference D1 that is a difference between the average values A and B, and a difference D2 that is a difference between the average values B and C. In particular, the structure determination unit 113 compares each of the differences D1 and D2 with a statistical fluctuation in noise to be superimposed on an image to determine whether there is a significant difference. Then, the structure determination unit 113 determines what kind of structure is present, based on the presence or absence of the significant difference.

FIGS. 5A, 5B, 5C and 5D are diagrams illustrating examples of cases where a structure is respectively determined to be flat, gradation, edge, or thin line. Similar to FIG. 4, each of FIGS. 5A, 5B, 5C and 5D illustrates an example of a relationship between three areas and an average value of pixel values in each pattern.

Figure 5A:
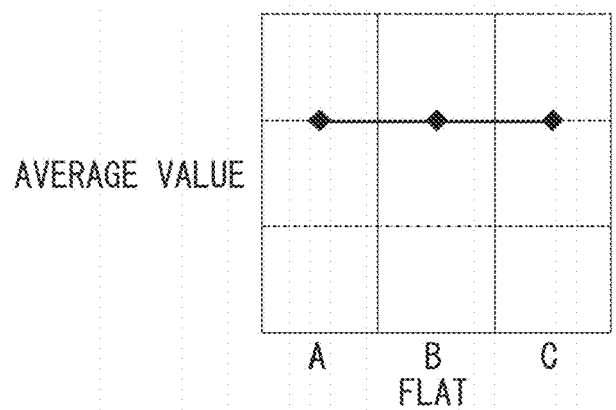
FIGS. 5A, 5B, 5C and 5D are diagrams illustrating examples of cases where a structure is determined to be flat, gradation, edge, and thin line, respectively.

For example, as illustrated in FIG. 5A, in a case where both the difference D1 and the difference D2 have no significant difference in comparison with the statistical fluctuation in noise to be superimposed on the image, a signal does not change in an area around the target pixel (an area of 5 pixels by 5 pixels if the pattern illustrated in FIG. 3 is used). In this case, the structure determination unit 113 determines that a structure of the target pixel is flat.

Figure 5B:
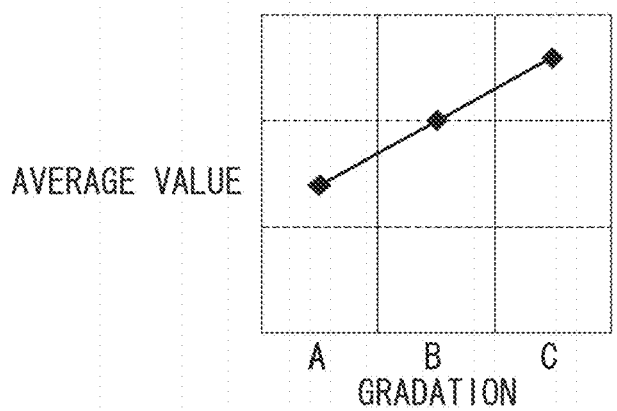

In FIG. 5B, both the difference D1 and the difference D2 have a significant difference in comparison with the statistical fluctuation in noise to be superimposed on the image, and there is a monotonous increasing (or monotonous decreasing) change in the average values A, B, and C. In this case, the structure determination unit 113 determines that a structure of the target pixel is gradation.

Figure 5C:
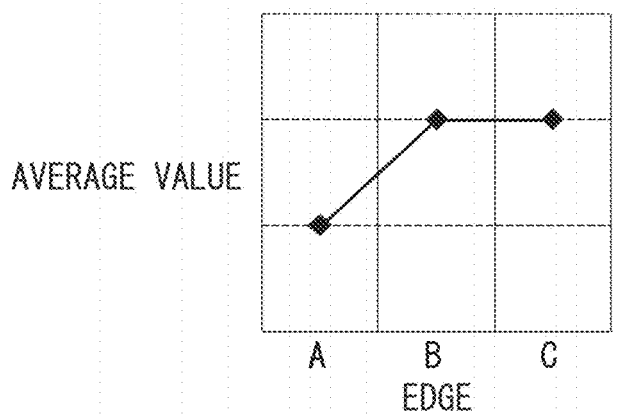

Further, as illustrated in FIG. 5C, in a case where either the difference D1 or the difference D2 has a significant difference in comparison with the statistical fluctuation in noise to be superimposed on the image, the structure determination unit 113 determines that a structure of the target pixel is edge.

Figure 5D:
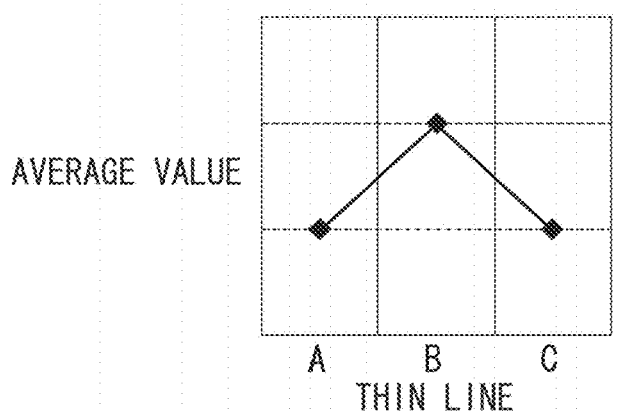

Furthermore, in FIG. 5D, both the difference D1 and the difference D2 have a significant difference in comparison with the statistical fluctuation in noise to be superimposed on the image, and a value of the average value B is the largest (or the smallest). In such a case, the structure determination unit 113 determines that a structure of the target pixel is thin line.

For example, the following criterion can be used as a criterion for determining whether there is a significant difference with respect to the statistical fluctuation in noise.

That is, assume that a fluctuation that exceeds a value triple of a standard deviation σ of noise to be superimposed on the image do not substantially occur from a stochastic standpoint. Accordingly, if absolute values of the differences D1 and D2 are larger than the value triple of the standard deviation (3σ) of noise to be superimposed on the image, the structure determination unit 113 determines that there is a significant difference with respect to the statistical fluctuation in noise.

The noise to be superimposed on the image predominantly includes quantum noise that is in proportional to a dose of radiation incident to the radiation detector 104, and system noise that does not depend on a dose of radiation incident to the radiation detector 104. A standard deviation of the quantum noise is $\sigma_q$, and a standard deviation of the system noise is $\sigma_s$. If the standard deviation $\sigma_q$ of the quantum noise and the standard deviation $\sigma_s$ of the system noise are not correlated, a standard deviation $\sigma(V)$ of noise to be superimposed on the image is expressed as follows:

$$\sigma(V) = \sqrt{\sigma_q^2 \cdot (V/G) + \sigma_s^2} \tag{3}$$

where V is a pixel value of the image, and G is a gain coefficient for conversion of the pixel value V in proportion to a dose of radiation incident to the radiation detector 104 into a value equivalent to the dose of radiation incident to the radiation detector 104.

As shown in Equation 3, the noise to be superimposed on the image is a value that depends on the pixel value V. Therefore, the structure determination unit 113 uses an average value of pixel values of neighboring pixels (in an area of 5 pixels by 5 pixels if the pattern illustrated in FIG. 3 is used) around the target pixel (i,j) as the pixel value V of the target pixel to calculate the standard deviation σ of the noise to be superimposed on the image. Then, the structure determination unit 113 determines whether there is a significant difference with respect to the statistical fluctuation in noise based on the calculated standard deviation σ.

Each of the quantum noise $\sigma_q$, the system noise $\sigma_s$, and the gain coefficient G as parameters in Equation 3 is a value that is uniquely determined in the process of imaging and can be calculated beforehand. Hence, the parameter calculated beforehand can be stored in the main memory 109, and such a parameter can be loaded when necessary.

A method for calculating the parameter is not limited to any one method. For example, when a product inspection is performed without a subject, images are photographed n times. In each time a dose of radiation incident to the radiation detector 104 is changed, and captured images preprocessed by the preprocessing unit 106 are acquired. Then, as illustrated in FIG. 6, discrete data $[(V_i, \sigma_i^2)|i=1, 2, \ldots, n]$ which is a relationship between the average value V of pixel values of each of the captured images and a noise variance $(=\sigma^2)$ is acquired, and a parameter that suitably approximates the discrete data is calculated. In particular, a parameter by which a sum of squares J of a residual value expressed by the following Equation 4 is the minimum is obtained by a method, such as the least-squares method, and the resultant parameter can be stored beforehand in the main memory 109.

$$J = \sum_{i=1}^{n} \{\sigma_i^2 - \sigma_q^2 \cdot (V_i/G) - \sigma_s^2\}^2 \tag{4}$$

With the above-described method, the structure determination unit 113 determines a structure present in the target pixel based on the noise characteristic of the preprocessed captured image. In short, with the above-described method, the noise characteristic is determined based on the preprocessed captured image, and also a structure is determined based on the preprocessed captured image. Hence, the structure can be determined with good accuracy without an influence of a change in a noise characteristic of an image due to other types of image processing.

Next, in step S202, the first image processing unit 114 performs predetermined image processing on the preprocessed captured image. The image processing performed by the first image processing unit 114 can be any image processing. In the present exemplary embodiment, sharpening processing that enhances an image sharpness is taken as an example of nonlinear image processing. For example, a method discussed in Japanese Patent Application Laid-Open No. 2003-348450 can be used as the sharpening processing. In the method discussed in Japanese Patent Application Laid-Open No. 2003-348450, adaptive filtering is performed according to a dose of radiation. For example, any of a plurality of filters each having a different characteristic is selected according to a pixel value which can be used as an index of a dose of radiation, and filtering is performed using the selected filter. Such filtering can emphasize a change in the pixel value with respect to the image. Since the sharpening processing is publicly known, a detailed description thereof is omitted. Examples of the predetermined image processing except for the sharpening processing include dynamic range compression processing and tone conversion processing.

According to the present exemplary embodiment, the preprocessed captured images are output to the structure determination unit 113 and the first image processing unit 114 in a parallel manner, i.e., the same captured images are output to the structure determination unit 113 and the first image processing unit 114.

Subsequently, the second image processing unit 115 performs predetermined image processing with respect to the image acquired through the predetermined processing performed by the first image processing unit 114. The predetermined image processing performed by the second image processing unit 115 differs from that performed by the first image processing unit 114. The image processing performed by the second image processing unit 115 can be any image processing as long as it differs from the image processing performed by the first image processing unit 114. In the present exemplary embodiment, the second image processing unit 115 performs the following processing. That is, the second image processing unit 115 selects any of a plurality of filters each having a different characteristic, according to a result of the structure determination. Herein, the second image processing unit 115 selects the any of a plurality of filters as a filter to be applied to the target pixel of the captured image which has acquired through the sharpening processing performed by the first image processing unit 114. In the present exemplary embodiment, all the pixels of the captured image acquired through the sharpening processing are target pixels. However, it is not necessary to set all the pixels of the captured image acquired through the sharpening processing as the target pixels. In step S203, the second image processing unit 115 performs noise reduction processing (smoothing processing) on the target pixel by using the selected filter. Particularly, the second image processing unit 115 averages only the pixels which have determined to have no significant difference with respect to the pattern in a direction in which the structure determined by the structure determination unit 113 extends, thereby reducing noise. That is, the second image processing unit 115 calculates a pixel value of the target pixel from pixel values of neighboring pixels around the target pixel based on the structure determined by the structure determination unit 113, so that noise can be reduced.

For example, a pattern with which an adaptability S is the maximum in a certain target pixel (i,j) may be determined to be a pattern of the filter 301, and a structure may be determined to be thin line. In this case, pixels corresponding to the white area and pixels corresponding to the gray area of the filter 301 illustrated in FIG. 3 have significant differences with respect to pixels corresponding to the black area. Thus, the second image processing unit 115 sets an average value of pixel values of only the pixels corresponding to the black area to a pixel value I(i,j) of a target pixel (i,j) acquired through the noise reduction processing.

As another example, a pattern with which an adaptability S is the maximum in a certain target pixel (i,j) may be determined to be a pattern of the filter 301, and a structure may be determined to be flat. In this case, pixels corresponding to the white area and pixels corresponding to the gray area of the filter 301 illustrated in FIG. 3 do not have a significant difference with respect to pixels corresponding to the black area. Accordingly, the second image processing unit 115 sets an average value of pixel values of all the pixels in an area of N-pixel long by N-pixel wide (5 pixels by 5 pixels in the example illustrated in FIG. 3) to a pixel value I(i,j) of a target pixel (i,j) acquired through the noise reduction processing. Similarly, as for the other structures, pixel values of pixels can be averaged by using only the pixels having no significant difference with respect to the pixels corresponding to the black area. The pixel values are averaged as described above, so that noise reduction processing can be effectively performed without blurring an edge of the structure.

The noise reduction method according to the structure determination result is not limited to the method described above. Various adaptive filters can be used according to a structure.

In the present exemplary embodiment, the structure determination unit 113 determines a structure that is present in a target pixel of a preprocessed captured image as described above. The first image processing unit 114 performs predetermined image processing (e.g., sharpening processing) based on a result of the determination for the structure present in the target pixel of the preprocessed captured image. The second image processing unit 115 performs image processing (e.g., noise reduction processing) on the image acquired through the predetermined image processing performed by the first image processing unit 114. The image processing performed by the second image processing unit 115 differs from the predetermined image processing. When the second image processing unit 115 performs the image processing, the image preprocessed (offset correction and gain correction) by the preprocessing unit 106 is output to each of the structure determination unit 113 and the first image processing unit 114. As described above, the determination of structure that requires a noise characteristic of an image is performed based on an image on which the sharpening processing has not yet been performed, so that the structure can be determined with good accuracy without an influence of the sharpening processing and image noise can be suitably reduced.

A second exemplary embodiment is described. The present exemplary embodiment is described using an example in which grid pattern reduction processing is performed prior to the sharpening processing and the structure determination processing described in the first exemplary embodiment. Thus, configuration and processing of the present exemplary embodiment differ from those of the first exemplary embodiment mainly by addition of the grid pattern reduction processing. Components that are similar to the first exemplary embodiment will be given the same reference numerals as illustrated in FIGS. 1 to 6 and description thereof will be omitted.

Figure 7:
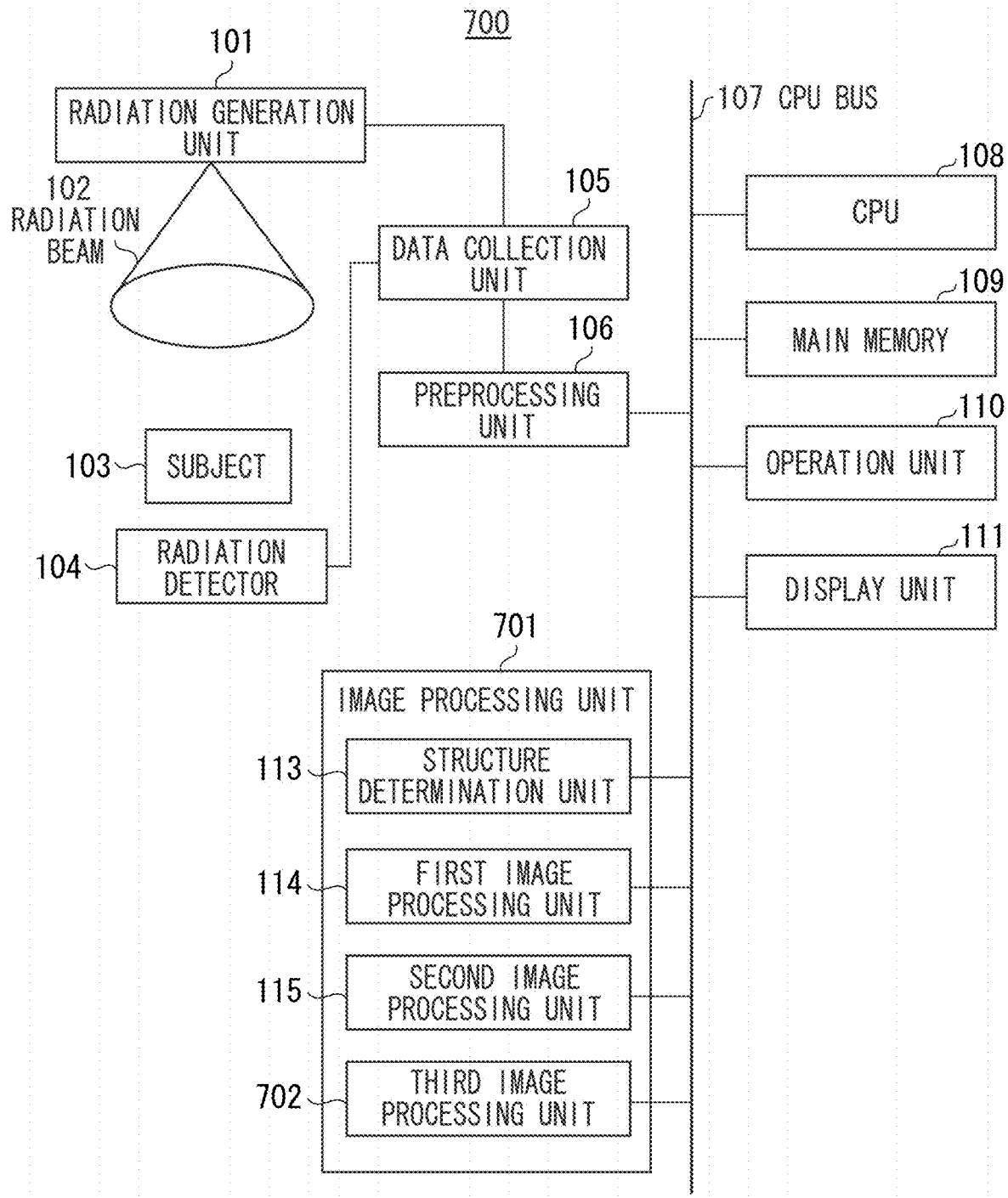
FIG. 7 is a diagram illustrating a configuration of a radiographic apparatus according to the second exemplary embodiment.

FIG. 7 is a diagram illustrating an example of a configuration of a radiographic apparatus 700. FIG. 8 is a flowchart illustrating an example of an operation performed by an image processing unit 701 of the radiographic apparatus 700.

The image processing unit 701 of the radiographic apparatus 700 includes a third image processing unit 702 in addition to a structure determination unit 113, a first image processing unit 114, and a second image processing unit 115. Hence, the configuration of the radiographic apparatus 700 of the present exemplary embodiment is prepared by adding the third image processing unit 702 to the radiographic apparatus 100 of the first exemplary embodiment.

In the present exemplary embodiment, a configuration in which the use of a scattered radiation removal grid (hereinafter called a grid) is presumed is added to the configuration of the first exemplary embodiment. Herein, the grid includes a radiation shielding material, such as lead, and a radiation transmitting material, such as aluminum and carbon. The radiation shielding material and the radiation transmitting material are alternately arranged with a predetermined space, so that the grid removes a scattered ray of the radiation. However, a periodical structure signal (hereinafter called a grid pattern) that is irrelevant to an anatomic structure of a human body is generated due to a difference in radiation transmittance of the alternately arranged materials.

In the present exemplary embodiment, the third image processing unit 702 reduces such a grid pattern by the following processing.

In step S801, the third image processing unit 702 detects the presence or absence of the grid pattern in image data preprocessed by the preprocessing unit 106. For such detection, for example, a method discussed in Japanese Patent No. 3903027 can be used. This method determines the presence or absence of a grid pattern based on whether there is a significant peak that is present on a power spectrum if the grid pattern is present on an image. Since such a method for detecting the presence or absence of the grid pattern is publicly known, a detailed description thereof is omitted.

In step S802, the third image processing unit 702 checks a detection result indicating the presence or absence of the grid pattern. In a case where there is no grid pattern (NO in step S802), the processing in step S201 to step S203 described above in the first exemplary embodiment is executed. On the other hand, in a case where there is a grid pattern (YES in step S802), the processing proceeds to step S803. In step S803, the third image processing unit 702 performs grid pattern reduction processing. In particular, for example, a method discussed in Japanese Patent No. 3903027 can be used. In this method, grid pattern prediction data is generated by model fitting, and a grid pattern is reduced based on the grid pattern prediction data. Since such a method for reducing the grid pattern is publicly known, a detailed description thereof is omitted.

Then, the processing in step S201 to step S203 described in the first exemplary embodiment is executed to the image in which the grid pattern has been reduced. Herein, the noise characteristic of the image is not substantially changed by the grid pattern reduction processing using the model fitting. Thus, the processing in step S201 can be executed using each of parameters of quantum noise $\sigma_q$, system noise $\sigma_s$, and a gain coefficient G (see Equation 3) that are determined as similar to a case where there is no grid pattern. According to the present exemplary embodiment, captured images on which the grid pattern reduction processing has been performed are output to the structure determination unit 113 and the first image processing unit 114 in a parallel manner, i.e., the same captured images are output to the structure determination unit 113 and the first image processing unit 114.

According to the present exemplary embodiment, the grid pattern is removed prior to the processing for determining a structure of a target pixel and the sharpening processing of the captured image. Therefore, in addition to the effects described in the first exemplary embodiment, an effect in which a structure can be determined with good accuracy is acquired even if a grid pattern that is a structure irrelevant to an anatomic structure of a human body originally intended to be determined is present.

Each of the above-described exemplary embodiments is only illustrative, and it is therefore to be understood that the technical scope of the present disclosure is not limited to the exemplary embodiments. Various modifications and enhancements are possible without departing from technical concepts or main features of the disclosure.

Other Embodiment

Aspects of each of the above-described exemplary embodiments can be realized when a program for providing functions of each of the exemplary embodiments is supplied to a system or an apparatus via a network or a storage medium, and one or more processors in a computer of the system or the apparatus read the program to execute processing. Moreover, the aspects can be realized by a circuit (e.g., an application specific integrated circuit (ASIC)) providing one or more functions.

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-031173, filed Feb. 22, 2016, which is hereby incorporated by reference herein in its entirety.

What is claimed is:

1. An image processing apparatus comprising:
one or more processors;
a storage configured to store therein a noise statistic value related to a radiation detector used for obtaining a first image; and
a memory containing instructions that when executed by the one or more processors, cause the one or more processors to perform operations, comprising:
performing, on a basis of the noise statistic value, processing for determining a structure present in a target pixel of the first image;
performing sharpening processing on the first image to obtain a second image; and
performing, based on a determination result of the structure present in the target pixel of the first image, noise reduction processing on the second image.

2. The image processing apparatus according to claim 1, wherein an image acquired by radiography is output as the first image.

3. The image processing apparatus according to claim 1, further comprising calculating a pixel value of the target pixel from pixel values of neighboring pixels around the target pixel of the second image, based on a determination result of the structure present in the target pixel of the first image.

4. The image processing apparatus according to claim 1, further comprising selecting, based on the determination result of the structure present in the target pixel of the first image, any of a plurality of filters each having a different characteristic as a filter to be applied to the target pixel of the second image acquired through the sharpening processing, and performing processing for reducing noise, by using the selected filter, on the image acquired through the sharpening processing.

5. The image processing apparatus according to claim 1, wherein the structure includes at least any of flat, gradation, edge, and thin line.

6. The image processing apparatus according to claim 1, wherein the performing processing includes determining a direction in which the structure present in the target pixel of the first image extends.

7. The image processing apparatus according to claim 1, further comprising performing nonlinear image processing on the first image.

8. The image processing apparatus according to claim 1, the performing sharpening processing on the first image by using a plurality of filters each having a different characteristic.

9. The image processing apparatus according to claim 1, further comprising performing an offset correction and a gain correction,
wherein the first image acquired through the offset correction and the gain correction is output.

10. The image processing apparatus according to claim 1, further comprising reducing a grid pattern that appears on the first image which is acquired by radiography.

11. The image processing apparatus according to claim 10, wherein the performing processing for determining the structure is performed on the first image from which the grid pattern has been reduced.

12. The image processing apparatus according to claim 10, further comprising performing an offset correction and a gain correction,
wherein the first image acquired through the offset correction and the gain correction is output.

13. The image processing apparatus according to claim 1, further comprising averaging pixels with respect to a pattern in a direction in which the structure extends to perform the noise reduction processing.

14. The image processing apparatus according to claim 1, wherein the noise statistic value is standard deviation of noise.

15. The image processing apparatus according to claim 1, wherein the noise statistic value is a value obtained by capturing a plurality of images without a subject.

16. An image processing method comprising:
determining, on a basis of a noise statistic value related to a radiation detector used for obtaining a first image stored in a storage, a structure present in a target pixel of a first image;
performing sharpening processing on the first image to obtain a second image; and
performing, based on a determination result of the structure present in the target pixel of the first image, noise reduction processing on the second image.

17. The method according to claim 16, further comprising performing an offset correction and a gain correction,
wherein the first image acquired through the offset correction and the gain correction is output.

18. The method according to claim 16, further reducing a grid pattern that appears on the first image which is acquired by radiography.

19. The method according to claim 18, wherein the determining the structure present in the target pixel is performed on the first image from which the grid pattern has been reduced.

20. The method according to claim 16, wherein the noise statistic value is standard deviation of noise.

21. The method according to claim 16, wherein the noise statistic value is a value obtained by capturing a plurality of images without a subject.

22. A non-transitory computer-readable storage medium storing a program causes a computer to perform each of the processing according to claim 1.

23. The non-transitory computer-readable storage medium according to claim 22, wherein an image acquired by radiography is output as the first image.

24. The non-transitory computer-readable storage medium according to claim 22, wherein the program further comprises causing the computer to perform an offset correction and a gain correction,
wherein the first image acquired through the offset correction and the gain correction is output.

25. The non-transitory computer-readable storage medium according to claim 22, wherein the program further comprises causing the computer to perform reducing a grid pattern that appears on the first image which is acquired by radiography.

* * * * *